(12) United States Patent
Noh et al.

(10) Patent No.: US 11,193,515 B2
(45) Date of Patent: Dec. 7, 2021

(54) BOOT CLAMPING STRUCTURE FOR CONSTANT VELOCITY JOINT

(71) Applicant: ERAE AMS CO., LTD., Daegu (KR)

(72) Inventors: Jung Su Noh, Daegu (KR); Joon Sung Park, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 16 days.

(21) Appl. No.: 16/645,572

(22) PCT Filed: Sep. 13, 2018

(86) PCT No.: PCT/KR2018/010751
§ 371 (c)(1),
(2) Date: Mar. 9, 2020

(87) PCT Pub. No.: WO2019/054770
PCT Pub. Date: Mar. 21, 2019

(65) Prior Publication Data
US 2020/0284278 A1 Sep. 10, 2020

(30) Foreign Application Priority Data
Sep. 13, 2017 (KR) .................. 10-2017-0117347

(51) Int. Cl.
*F16B 2/06* (2006.01)
*F16D 3/84* (2006.01)

(52) U.S. Cl.
CPC ............... *F16B 2/06* (2013.01); *F16D 3/845* (2013.01)

(58) Field of Classification Search
CPC .......... F16D 3/841; F16D 3/843; F16D 3/845; F16D 3/84; F16B 2/06
See application file for complete search history.

(56) References Cited

U.S. PATENT DOCUMENTS 5,672,113 A * 9/1997 Tomogami ............... F16J 3/042
464/175
6,220,969 B1 * 4/2001 Lilley ..................... F16D 3/845
464/173
(Continued)

FOREIGN PATENT DOCUMENTS

| JP | 2-109022 U | 8/1990 |
| JP | 4-3168 U | 1/1992 |

(Continued)

OTHER PUBLICATIONS

International Search Report for PCT/KR2018/010751 dated Jan. 29, 2019 [PCT/ISA/210].

*Primary Examiner* — Robert Sandy
*Assistant Examiner* — Michael S Lee
(74) *Attorney, Agent, or Firm* — Sughrue Mion, PLLC (57) ABSTRACT

It is a technical object of the present invention to provide a boot clamping structure for a constant velocity joint that can securely fasten a clamp and a boot so that the clamp and the boot do not run against each other. To this end, the boot clamping structure for a constant velocity joint of the present invention is a boot clamping structure for a constant velocity joint for fastening both ends of a boot using a clamp, and includes a main pressing portion that is provided to be protruded in a first direction toward the boot on an inner circumferential surface of the clamp.

4 Claims, 6 Drawing Sheets

(56) References Cited

U.S. PATENT DOCUMENTS

| | | | | |
|---|---|---|---|---|
| 2005/0192107 | A1* | 9/2005 | Toriumi | F16D 3/84 |
| | | | | 464/175 |
| 2011/0159971 | A1* | 6/2011 | Deisinger | F16J 3/042 |
| | | | | 464/175 |
| 2019/0353209 | A1* | 11/2019 | Deisinger | F16D 3/845 |

FOREIGN PATENT DOCUMENTS

| | | |
|---|---|---|
| JP | 7-42841 A | 2/1995 |
| JP | 2015-516558 A | 6/2015 |
| KR | 10-2006-0063119 A | 6/2006 |
| KR | 20-0446821 Y1 | 12/2009 |
| KR | 10-2011-0120783 A | 11/2011 |
| KR | 10-2013-0104407 A | 9/2013 |
| KR | 10-1605416 B1 | 3/2016 |

* cited by examiner

BOOT CLAMPING STRUCTURE FOR CONSTANT VELOCITY JOINT

CROSS REFERENCE TO RELATED APPLICATIONS

This application is a National Stage of International Application No. PCT/KR2018/010751 filed Sep. 13, 2018, claiming priority based on Korean Patent Application No. 10-2017-0117347 filed Sep. 13, 2017.

TECHNICAL FIELD

The present invention relates to a constant velocity joint for a drive shaft of a vehicle.

BACKGROUND ART

Generally, the power of an engine of a vehicle is transmitted to a drive wheel by a drive shaft via a transmission. At this time, the drive shaft that receives the torque of an engine to rotate at a high speed may cause torsional vibration or bending vibration. Accordingly, a drive shaft is equipped with shaft coupling members at both ends thereof to smoothly transfer the power transmitted from an engine to a drive wheel.

A constant velocity joint is one of the above-mentioned shaft coupling member, which is a cup-shaped housing (also called an "outer race") having a connecting end and an open end, an actuating member (also called an "inner race") provided on an inner surface of the housing through the open end and to which the drive shaft is connected, and a boot covering the open end of the housing to seal lubricant (e.g., grease). In particular, the boot is made of rubber or the like, and one end of the boot is coupled to the housing by a first clamp and the other end of the boot is coupled to the drive shaft by a second clamp. Here, lubricant plays roles of vibration reduction and wear reduction as well as lubrication.

However, in harsh external environments, i.e. in harsh temperatures, either high or low temperatures, the boot is distorted with the rotation of the drive shaft, and the first and second clamps relatively swing around the surface of one end and the other end of the boot, and thereby there is a problem that the sealing performance of the boot becomes deteriorated, e.g., the lubricant may be spilled.

DETAILED DESCRIPTION OF THE INVENTION

Technical Problem

The technical problem of the present invention is to provide a boot clamping structure for a constant velocity joint in which a clamp and a boot can be securely clamped to each other so that the clamp and the boot do not slip against each other.

Technical Solution

To achieve the above-described object, a boot clamping structure for a constant velocity joint is a boot clamping structure for a constant velocity joint for fastening both ends of the boot respectively using a clamp and includes a main pressing portion that is provided to be protruded in a first direction toward the boot on an inner circumferential surface of the clamp.

The main pressing portion may include a plurality of main pressing protrusions disposed at intervals along the inner circumferential surface of the clamp.

As an example, each of the main pressing protrusions may have a shape of "X" which is an English alphabet when viewed in a direction opposite to the first direction.

As another example, each of the main pressing protrusions may have a shape of a symbol "<" or ">" when viewed in a direction opposite to the first direction.

The main pressing protrusion of a shape of "<" and the main pressing protrusion of a shape of ">" may be alternately disposed.

A boot clamping structure for a constant velocity joint according to an embodiment of the present invention may further include an auxiliary pressing portion that is provided to be protruded in a second direction toward the clamp on an outer circumferential surface of the boot.

The auxiliary pressing portion may include a plurality of auxiliary pressing protrusions that are disposed at intervals along an outer circumferential surface of the boot.

Meanwhile, a boot clamping structure for a constant velocity joint according to an embodiment of the present invention is a boot clamping structure for a constant velocity joint for fastening both ends of a boot respectively using a clamp and includes a pressing portion that is provided to be protruded in a second direction toward the clamp on an outer circumferential surface of the boot.

The pressing portion may include a plurality of pressing protrusions disposed at intervals along the outer circumferential surface of the boot.

Effects of the Invention

As described above, the boot clamping structure for the constant velocity joint according to the embodiment of the present invention may have the following effects.

According to the present invention, with the feature of the main pressing portion that is provided to be protruded in a first direction toward a boot on an inner circumferential surface of a clamp, the boot is pressed by the main pressing portion while the clamp is fastened so that the clamp and the boot can be firmly fastened to each other without running against each other even if the boot is twisted with the rotation of the drive shaft 1 in a harsh external environment such as high or low temperature. Ultimately, leakage of lubricant can be prevented to improve the sealing performance of the boot.

DETAILED DESCRIPTION OF THE EMBODIMENTS

Hereinafter, exemplary embodiments of the present invention will be described in detail with reference to the accompanying drawings so that those skilled in the art may easily implement the present invention. As those skilled in the art would realize, the described embodiments may be modified in various different ways, all without departing from the spirit or scope of the present invention.

Figure 1:
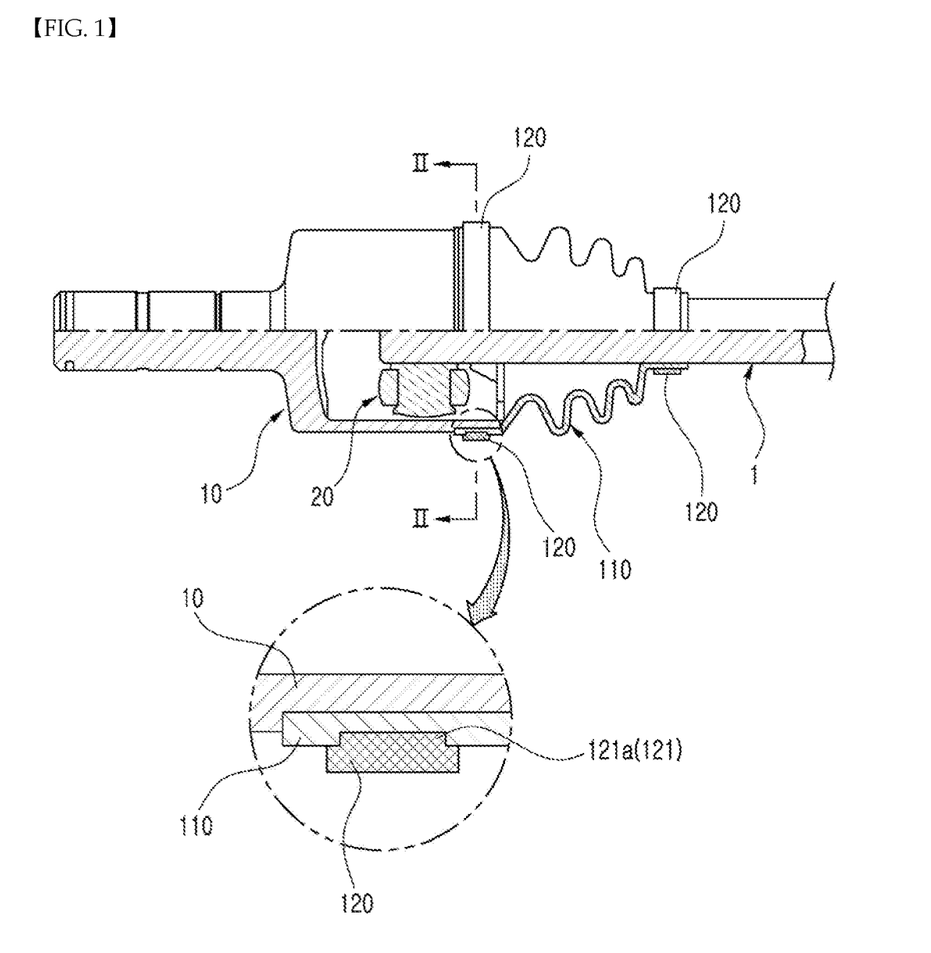
FIG. 1 is a partial cutaway view schematically showing a constant velocity joint to which a boot clamping structure for a constant velocity joint according to a first embodiment of the present invention is applied.
Figure 2:
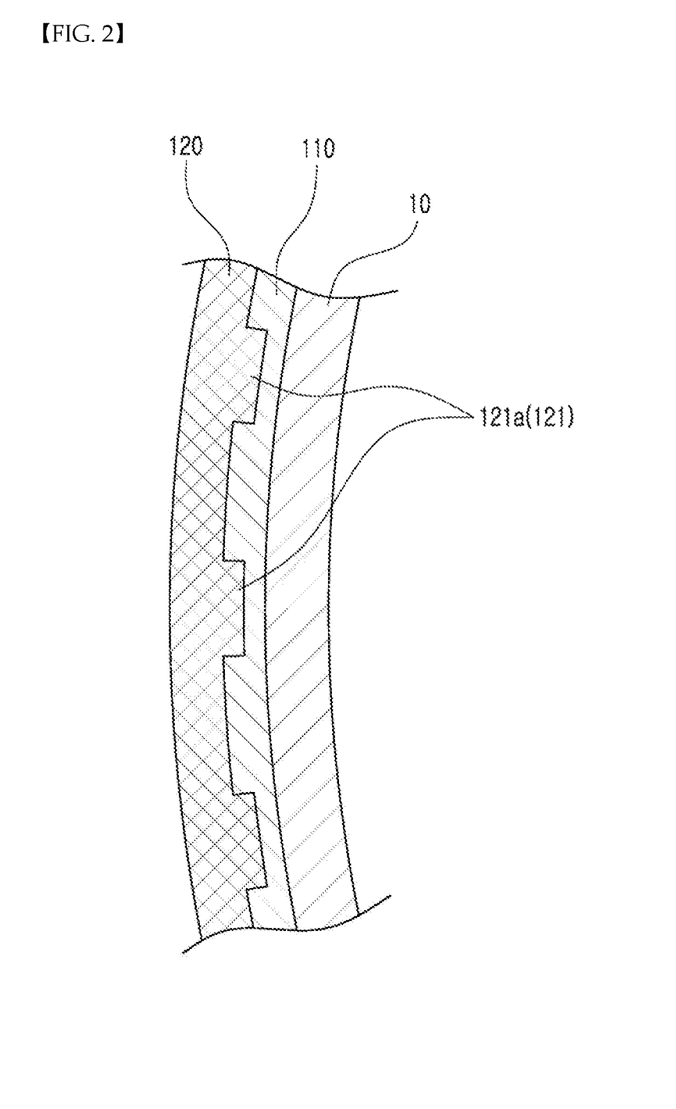
FIG. 2 is a cross-sectional view taken along a line II-II of a constant velocity joint of FIG. 1 to show a boot clamping structure for a constant velocity joint according to a first embodiment of the present invention.
Figure 3:
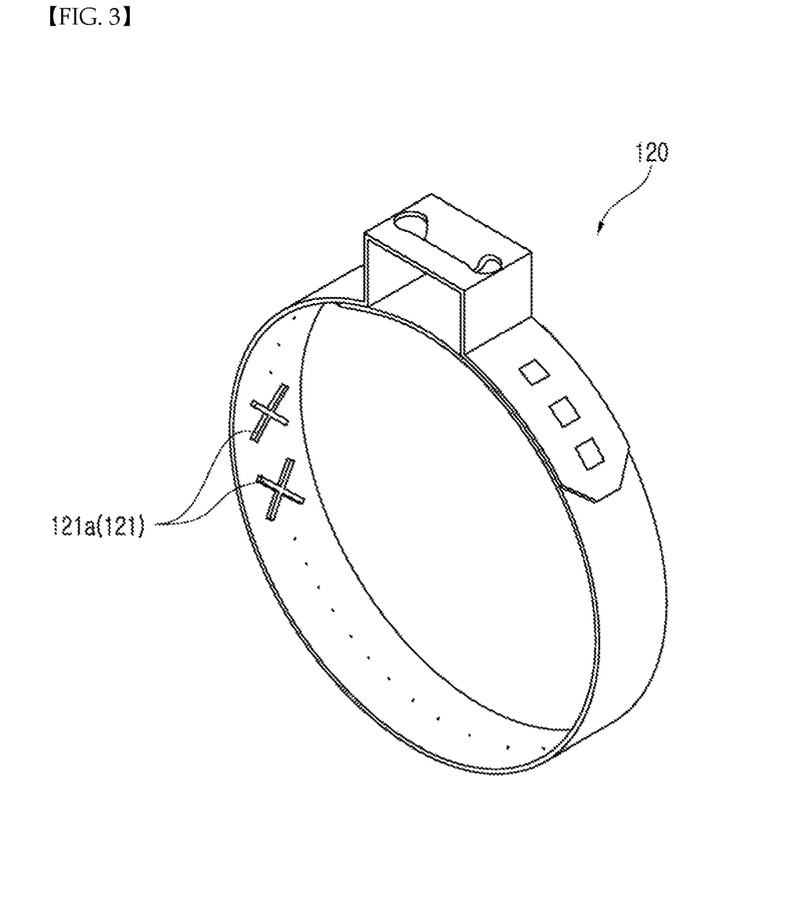
FIG. 3 is a perspective view schematically illustrating a clamp having a boot clamping structure for a constant velocity joint of FIG. 1.

FIG. 1 is a partial cutaway view schematically showing a constant velocity joint to which a boot clamping structure for a constant velocity joint according to a first embodiment of the present invention is applied, FIG. 2 is a cross-sectional view taken along a line II-II of a constant velocity joint of FIG. 1 to show a boot clamping structure for a constant velocity joint according to a first embodiment of the present invention, and FIG. 3 is a perspective view schematically illustrating a clamp having a boot clamping structure for a constant velocity joint of FIG. 1.

Prior to the description of the present invention, as shown in FIG. 1, a constant velocity joint includes typically a cup-shaped housing (also referred to as an "outer race") 10 and an actuation mechanism (also referred to as an "inner race") 20. The housing 10 may have a connecting end and an open end, and the actuation mechanism 20 is provided on an inner surface of the housing 10 through the open end of the housing 10, a drive shaft 1 being connected to the actuation mechanism 20. Hereinafter, a boot clamping structure for a constant velocity joint according to a first embodiment of the present invention will be described.

A boot clamping structure for the constant velocity joint according to the first embodiment of the present invention, as shown in FIG. 1 to FIG. 3, is a boot clamping structure for a constant velocity joint for fixing both ends of a boot 110 by clamps 120, respectively and includes a main pressing portion 121. Hereinafter, the main pressing portion 121 will be described in detail with reference to FIG. 1 to FIG. 3.

The main pressing portion 121 is a component that presses and pushes the boot 110 while the clamp 120 is being fastened or after the clamp 120 is fastened, and as shown in FIG. 1 to FIG. 3, may be provided to protrude in a first direction toward the boot 110 on an inner peripheral surface of a clamp 120.

Here, the clamp 120 may be made of metallic material or the like, and the main pressing portion 121 may also be made of metallic material or the like. In addition, the main pressing portion 121 may be integrally formed with the clamp 120. In addition, the boot 110 may be made of material such as rubber. Therefore, while the clamp 120 is being fastened or after the clamp 120 is fastened, the metal main pressing portion 121 may push the rubber boot 110 by pressing the same, main pressing portion 121 is bound to the pushed region so that the clamp 120 and the boot 110 may be firmly fixed without running against each other.

For example, as illustrated in FIG. 2 and FIG. 3, the main pressing portion 121 may include a plurality of main pressing protrusions 121a disposed at intervals along an inner circumferential surface of the clamp 120. Accordingly, the pressing force can be applied evenly along an outer circumferential surface of the boot 110, thereby achieving a more rigid fastening structure between the clamp 120 and the boot 110.

In particular, each of the main pressing protrusions 121a may have a shape of "X" which is an English alphabet when viewed in a direction opposite to a first direction (a direction from the inner circumferential surface of the clamp 120 toward the boot 110). Therefore, even when the clamp 120 is to be rotated in a forward or reverse direction along the outer circumferential surface of the boot 110, the clamp 120 has a shape that gradually decreases in both directions due to the characteristics of the "X" shape, and the boot 110 can thus be more firmly fastened.

Hereinafter, a boot clamping structure for a constant velocity joint according to a second embodiment of the present invention will be described with reference to FIG. 4.

Figure 4:
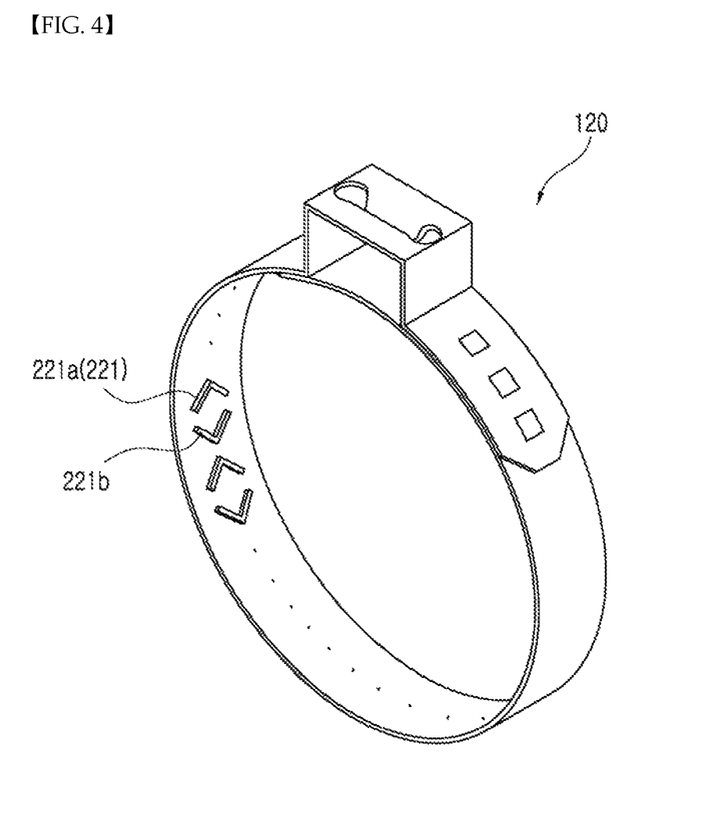
FIG. 4 is a perspective view schematically showing a clamp having a boot clamping structure for a constant velocity joint according to a second embodiment of the present invention.

FIG. 4 is a perspective view schematically showing a clamp having a boot clamping structure for a constant velocity joint according to a second embodiment of the present invention.

Since a boot clamping structure for a constant velocity joint according to the second embodiment of the present invention, as shown in FIG. 4, is the same as a first embodiment except for the shape of the main pressing projections 221a and 221b of the main pressing portion 221, the shapes of the main pressing protrusions 221a and 221b are described mainly hereinafter.

Each of the main pressing projections 221a and 221b may have a shape of a parenthesis symbol "<" or ">" when viewed in a direction opposite to a first direction (a direction from the inner circumferential surface of the clamp 120 toward the boot 110). In particular, the main pressing protrusion 221a having the "<" shape and the main pressing protrusion 221b having the ">" shape may be alternately arranged along the inner circumferential surface of the clamp 220.

Therefore, even if the clamp 220 is to be rotated in the forward or reverse direction along the outer circumferential surface of the boot 110, each of the clamp 220 has a "<" and ">" shape that have a width gradually decreasing in both directions, so the clamp 220 and the boot 110 can be more firmly fastened by the main pressing protrusion 221a having the "<" shape if it is to be rotated in a forward direction and the claim 220 and the boot 110 can be more firmly fastened by the main pressing portion 221b having the ">" shape if it is to be rotated in a reverse direction.

Hereinafter, a boot clamping structure for a constant velocity joint according to a third embodiment of the present invention will be described with reference to FIG. 5.

Figure 5:
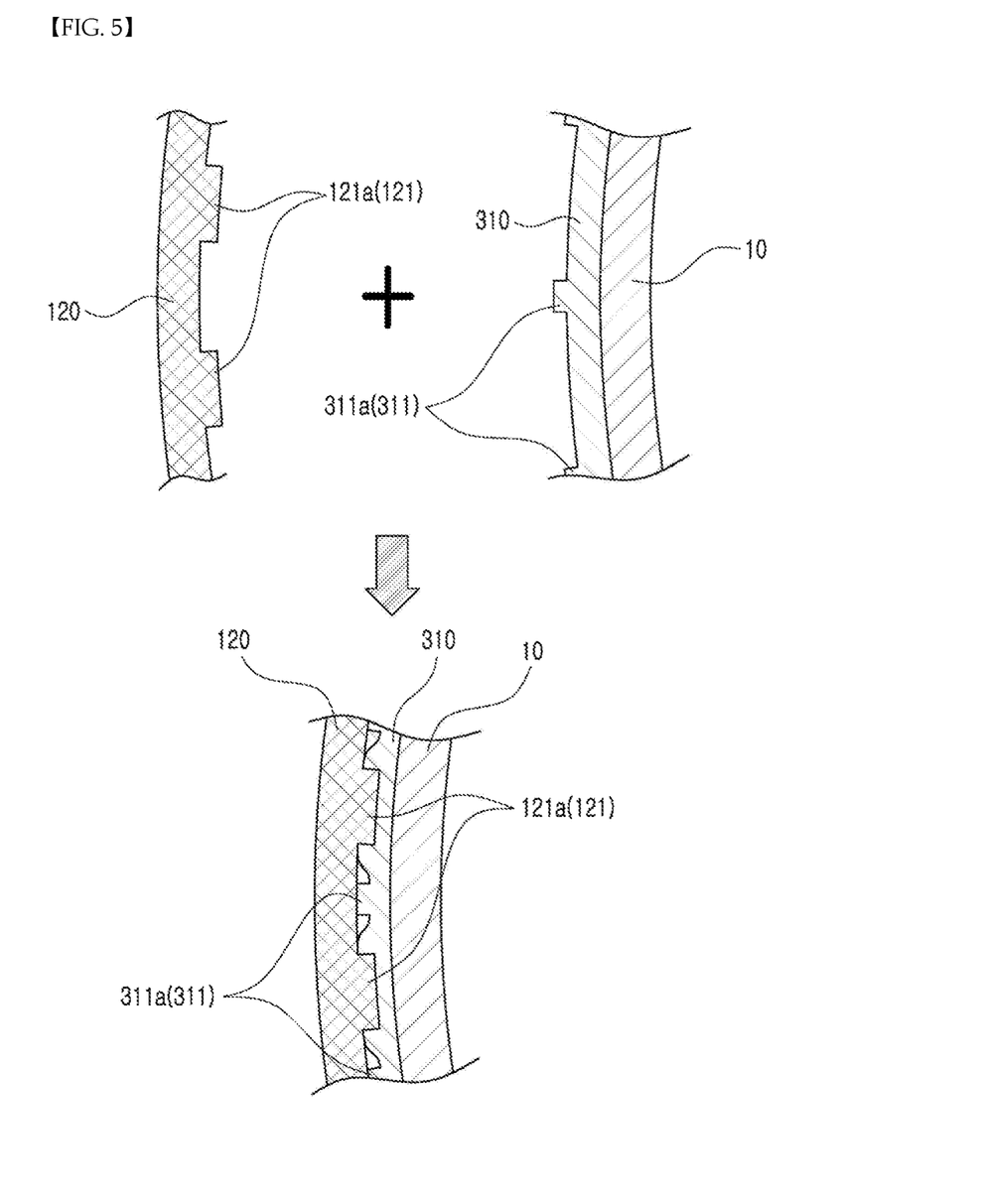
FIG. 5 is a schematic cross-sectional view of a boot clamping structure for a constant velocity joint according to a third exemplary embodiment of the present invention.

FIG. 5 is a perspective view schematically showing a clamp having a boot clamping structure for a constant velocity joint according to a third embodiment of the present invention.

Since a boot clamping structure for a constant velocity joint according to the third embodiment of the present invention, as shown in FIG. 5, is the same as a first embodiment except for further including an auxiliary pressing portion 311, the auxiliary pressing portion 311 is described mainly hereinafter.

The auxiliary pressing portion 311 may be provided to protrude in a second direction toward the clamp 120 on the outer circumferential surface of the boot 310. For example, the auxiliary pressing portion 311 may include a plurality of auxiliary pressing protrusions 311a disposed at intervals along the outer circumferential surface of the boot 310. Although not shown, each of the auxiliary pressing protrusions 311a may have the "X" shape mentioned in the first embodiment of the present invention described above or alternately have the "<" shape or the ">" shape mentioned in the second embodiment of the present invention described above.

Further, when the clamp 120 is made of metal and the boot 310 and each of the auxiliary pressing protrusions 311a are made of rubber, each of the auxiliary pressing protrusions 311a is pushed to be compressed by the inner circumferential surface of the clamp 120 as illustrated in FIG. 5 so that the clamp 120 and the boot 310 may be firmly fastened.

Hereinafter, a boot clamping structure for a constant velocity joint according to a fourth embodiment of the present invention will be described with reference to FIG. 6.

Figure 6:
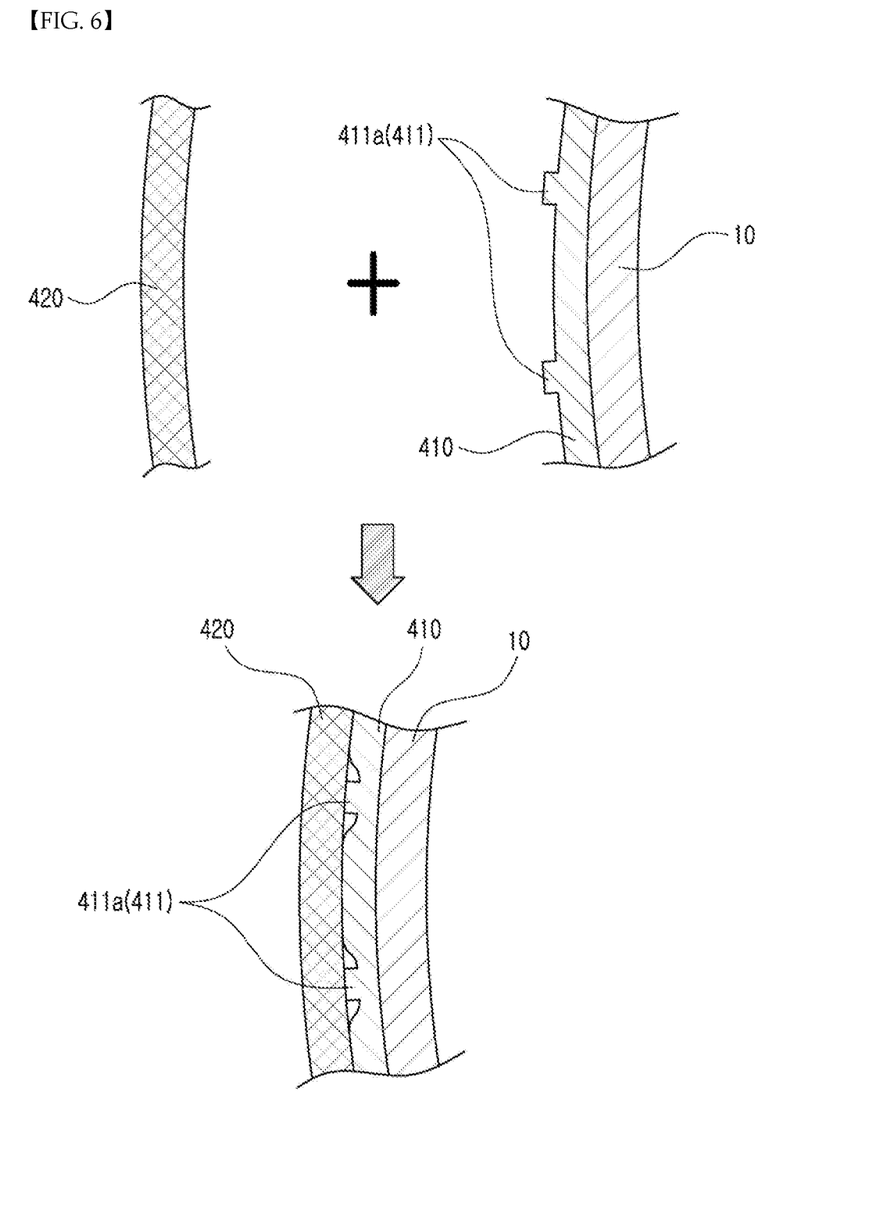
FIG. 6 is a schematic cross-sectional view of a boot clamping structure for a constant velocity joint according to a fourth exemplary embodiment of the present invention.

FIG. 6 is a perspective view schematically showing a clamp having a boot clamping structure for a constant velocity joint according to a fourth embodiment of the present invention.

A boot clamping structure for a constant velocity joint according to the fourth embodiment of the present invention, as shown in FIG. 6, is a boot clamping structure for a constant velocity joint for fastening both ends of the boot 410 using the respective clamps 420, and may includes a pressing portion 411 which is provided to be protruded in a second direction toward the clamp 420 on an outer circumferential surface of the boot 410.

The pressing portion 411 may include a plurality of pressing protrusions 411a disposed at intervals along the outer circumferential surface of the boot 410. Although not shown, each of the pressing protrusions 411a may have an "X" shape mentioned in the first embodiment of the present invention as described above, and may also have alternately the "<" shape or the ">" shape mentioned in the second embodiment of the present invention described above.

Further, when the clamp 420 is made of metal and the boot 410 and each of the pressing protrusions 411a are made of rubber, each of the pressing protrusions 411a may be pushed by an inner surface of the clamp 420 to be compressed as shown in FIG. 6 so that the clamp 420 and the boot 410 can be firmly fastened.

As described above, the boot clamping structure for the constant velocity joint according to the embodiments of the present invention may have the following effects.

According to the embodiments of the present invention, the boot 110, 310 or 410 is pressed by the pressing portion 121, 221, 311 or 411 while the clamp 120, 220 or 420 is fastened, so that the clamp 120, 220 or 420 and the boot 110, 310 or 410 can be firmly fastened to each other without running against each other even if the boot 110, 310 or 410 is twisted with the rotation of the drive shaft 1 in a harsh external environment such as high or low temperature. Ultimately, leakage of lubricant can be prevented to improve the sealing performance of the boot.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a boot of a constant velocity joint, so it has an industrial applicability.

The invention claimed is:

1. A boot clamping structure for a constant velocity joint for fastening both ends of a boot respectively using a clamp comprising a main pressing portion that is provided to be protruded in a first direction toward the boot on an inner circumferential surface of the clamp; and
an auxiliary pressing portion that is provided to be protruded in a second direction toward the clamp on an outer circumferential surface of the boot,
wherein the main pressing portion comprises a plurality of main pressing protrusions disposed at intervals along the inner circumferential surface of the clamp,
wherein the auxiliary pressing portion comprises a plurality of auxiliary pressing protrusions that are disposed at intervals along an outer circumferential surface of the boot,
wherein each respective auxiliary pressing protrusion is disposed between neighboring main pressing protrusions, and
wherein each main pressing protrusion has a portion that becomes narrower along a circumferential direction of the clamp.

2. The boot clamping structure for a constant velocity joint of claim 1, wherein each of the main pressing protrusions has a shape of the letter "X" when viewed in a direction opposite to the first direction.

3. The boot clamping structure for a constant velocity joint of claim 1, wherein each of the main pressing protrusions has a shape of a symbol "<" or ">" when viewed in a direction opposite to the first direction.

4. The boot clamping structure for a constant velocity joint of claim 3, wherein the main pressing protrusion of a shape of "<" and the main pressing protrusion of a shape of ">" are alternately disposed.

* * * * *